Patented June 19, 1945

2,378,813

UNITED STATES PATENT OFFICE 2,378,813

RECOVERY OF OIL FROM CONTACT CLAY

James L. Walker, Baytown, Tex., assignor to Standard Oil Development Company, a corporation of Delaware No Drawing. Application March 8, 1943, Serial No. 478,475

3 Claims. (Cl. 196—147)

The present invention is directed to the recovery of oils from pulverized clay or similar adsorbent bodies which have previously been contacted with such oils to decolorize or purify them. More particularly the invention is concerned with the recovery of petroleum lubricating oils from absorbent materials.

It is known to the art that the pulverized clays commonly employed for decolorizing and purifying lubricating oils retain substantial amounts of lubricating oils. When these clays are discarded as spent, they may retain, on a dry basis, as much as 40% by weight of high quality lubricating oil in addition to dark colored resinous material removed from the lubricating oils treated by the clay. Because of the large amount of high quality oil adhering to the clay, attempts have heretofore been made to recover the oil from the clay.

The conventional procedure for treating spent contact clay to recover lubricating oils therefrom involves admixing with the spent contact clay a large volume of solvent of a lower boiling range than the lubricating oil. Solvents such as petroleum ether, gasoline, or non-viscous neutrals, may be admixed with the spent clay in amounts ranging from 5 to 15 times the volume of the oil adhering to the spent contact clay. The admixture may then be strained through a suitable filtering medium to separate the clay from the liquid fraction. It appears that the dilution of the spent clay with oil and its subsequent filtration does not materially reduce the total amount of liquid retained by the clay, but a considerable portion of the more expensive lubricating oil is displaced by the less expensive solvent and is recovered. In addition, the solvent left on the clay may then be recovered therefrom by distillation.

It may be pointed out that one of the principal disadvantages of this procedure is the necessity of removing the diluent from the recovered lubricating oil. This separating step is customarily carried out by distillation, and the large volume of diluent which must be evaporated from the recovered lubricating oil often involves the use of so much energy as to make the process commercially unprofitable.

In accordance with the present invention lubricating oil is recovered from spent contact clay by admixing the clay with relatively small amounts of liquid capable of dissolving the lubricating oil to form a slurry or mud and subsequently applying a mechanical pressure to the slurry under conditions which will allow the slurry to separate into a solid fraction and a liquid fraction. By proper selection of solvent and temperature it is possible to dissolve only the good lubricating oil from the clay, leaving the resinous oil undissolved, or, if desired, to dissolve all the oil adhering to the clay. This procedure may be modified if desired by employing two liquids to form a slurry with the spent contact clay, one of the liquids being miscible with the lubricating oil retained by the clay and acting as a solvent therefor, and the other liquid being immiscible therewith. The use of the miscible and immiscible liquids together to form the slurry of the spent filter clay enables even larger amounts of oil to be recovered than when only a miscible liquid is used.

In accordance with the present invention a spent contact clay is admixed with a liquid miscible with the lubricating oil retained by the clay in the ratio of oil soluble in the solvent to solvent ranging from 1:0.5 to 1:1.5 by volume. The slurry mud may then be subjected to a mechanical pressure ranging from 50 to 3000 pounds per square inch in a press arranged to allow the drainage of liquid as the pressure is applied. A suitable press, for example, is one wherein a cylinder is fitted with a screen at one end and a close fitting piston entering from the other end with means arranged for applying pressure to the piston. The solution pressed from the slurry by the mechanical pressure may then be distilled to separate the solvent from the lubricating oil.

Particularly good results have been obtained by admixing not only a solvent with the spent contact clay in the amount above stated, but in addition adding thereto a liquid immiscible in the oil and in the solvent. The immiscible liquid is usually added to the spent clay and solvent in amounts within the range of the solvent present and forms a thick paste. This paste may then be subjected to a mechanical pressure to separate a liquid phase from the clay and the liquid distilled to recover lubricating oil from the remaining liquid. It will, of course, be understood that the solvent is preferably recovered and may be used repeatedly.

Liquids which are miscible with the lubricating oil and are suitable to act as a solvent in practicing the present invention includes such materials as naptha, petroleum ether, benzol, ketones, esters or combinations of these various solvents. Liquids immiscible with lubricating oil and with the solvents listed above generally include water or aqueous solutions such as brine, alkali, or acid solutions. Generally because of its cheapness, water will be employed in admixture with the diluent and spent clay but on occasions aqueous solutions, particularly solutions of sulfuric acid of approximately 2% strength will be found desirable.

In order to demonstrate the advantages of the present invention, data are given in the table below showing results obtained from actual operation. In obtaining these results the clay slurry was placed in a cylinder fitted with a screen at the bottom and a plunger piston entering from the top. The pressure was applied slowly by forcing the plunger downwardly until the pressure indicated in the table had been reached.

*Table*

| Run No. | Treatment of clay prior to pressing | Final pressure, lbs./sq. in. gauge | Analysis of pressed cake | | Percent of good quality lube removed |
|---|---|---|---|---|---|
| | | | Ash, percent | Good lube oil, lbs./lb. dry clay | |
| 1 | Sample of spent clay from Sweetland press | | 64.6 | 0.390 | |
| 2 | (a) Compressed to 1,000 lbs./sq. in., (b) flooded with water and re-compressed | 1,350 | 64.8 | 0.385 | 1.3 |
| 3 | Pressed hot (200° F.) | 3,350 | 66.6 | 0.343 | 12.1 |
| 4 | Pepared mud with 20% by wt. solvent and 80% spent rclay | 1,000 | 70.8 | 0.258 | 33.9 |
| 5 | Prepared mud with 10% solvent and 90% clay (by wt.) | 500 | 69.7 | 0.276 | 29.2 |
| 6 | Prepared mud of water and spent clay | 1,000 | 64.9 | 0.383 | 1.8 |
| 7 | Mud of 10% solvent and 90% clay, then mixed this with water to a thick "paste" | 500 | 71.8 | 0.233 | 40.2 |

From the above table it will be seen that very little lubricating oil could be recovered from the spent clay merely by mechanically compressing the clay or even by flooding the filter cake with water and compressing it. It will also be evident that, although advantageous results are obtained by the admixture of relatively small amounts of solvent with the spent clay and then mechanically compressing the slurry, even more satisfactory results are obtained when an immiscible liquid, such as water, is admixed with the solvent and contact clay before compressing the slurry.

It will be apparent to one skilled in the art that increased recovery over and above that obtainable in single stage operation, as illustrated in the several examples, may be obtained in multiple stage operation or multiple stage counter-current operation in which the solvent from one stage is used in another stage.

While the invention has been described with respect to recovery of petroleum lubricating oils from clay, it is within the spirit and scope of the present invention to recover other types of oil from absorbent bodies.

Having fully described the present invention, what I desire to claim is:

1. A method for recovering lubricating oil from a contact clay previously employed for decolorizing lubricating oil by contact therewith comprising the steps of admixing said clay with a liquid solvent for the oil retained thereby in amounts comparable to the amount of oil present in said clay and with a liquid immiscible in both said oil and said solvent to form a paste and subsequently applying mechanical pressure to said paste while withdrawing liquid therefrom to form a liquid fraction and a solid fraction and subsequently recovering lubricating oil from said liquid fraction.

2. A method in accordance with claim 1 in which the ratio of lubricating oil present in the clay to the solvent is in the range of 1:0.5 to 1:1.5.

3. A method in accordance with claim 1 in which the solvent is petroleum ether and the liquid immiscible in both the lubricating oil and the solvent is water.

JAMES L. WALKER.